US008639257B2

(12) United States Patent
Sammour et al.

(10) Patent No.: US 8,639,257 B2
(45) Date of Patent: *Jan. 28, 2014

(54) METHOD AND APPARATUS FOR EFFICIENT ADDRESSING AND POWER SAVINGS IN WIRELESS COMMUNICATIONS

(75) Inventors: Mohammed Sammour, Al Rabieh Amman (JO); Sudheer A. Grandhi, Pleasanton, CA (US); Arty Chandra, Manhasset Hills, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 389 days.

This patent is subject to a terminal disclaimer.

(21) Appl. No.: 13/036,456

(22) Filed: Feb. 28, 2011

(65) Prior Publication Data
US 2011/0149822 A1   Jun. 23, 2011

Related U.S. Application Data

(60) Continuation of application No. 12/539,837, filed on Aug. 12, 2009, now Pat. No. 7,899,462, which is a division of application No. 11/406,877, filed on Apr. 19, 2006, now Pat. No. 7,577,438.

(60) Provisional application No. 60/674,811, filed on Apr. 25, 2005.

(51) Int. Cl.
H04W 72/00   (2009.01)
(52) U.S. Cl.
USPC .................... 455/450; 370/311; 370/329
(58) Field of Classification Search
None
See application file for complete search history.

(56) References Cited

U.S. PATENT DOCUMENTS

| 5,742,833 | A    | 4/1998 | Dea et al. |
| 6,856,603 | B1   | 2/2005 | Vollmer et al. |
| 7,577,438 | B2 * | 8/2009 | Sammour et al. ............ 455/450 |
| 7,899,462 | B2 * | 3/2011 | Sammour et al. ............ 455/450 |

(Continued)

FOREIGN PATENT DOCUMENTS

| WO | 02/39620    | 5/2002  |
| WO | 2004/029770 | 4/2004  |
| WO | 2004/109974 | 12/2004 |
| WO | 2005/004500 | 1/2005  |

OTHER PUBLICATIONS

Institute of Electrical and Electronics Engineers, Inc., 802.11n Working Group of the 802 Committee, Draft Amendments to Standard For Information Technology—Telecommunications and Information Exchange Between Systems—Local and Metropolitan Networks—Specific Requirements—Part 11: Wireless LAN Medium Access Control (MAC) and Physical Layer (PHY) Specifications: Enhancements for Higher Throughput, IEEE 802.11n/D0.01, Jan. 2006.

(Continued)

*Primary Examiner* — Erika A Washington
(74) *Attorney, Agent, or Firm* — Volpe and Koenig, P.C.

(57) ABSTRACT

A method and apparatus for addressing groups of stations in wireless communications by assigning the stations into a number of groups. Group information may be signaled to each station and a group identifier may be indicated in a frame. The group information may be applied to a performance enhancement, for example power savings for the station, wherein the station enters a power saving mode on a condition that the station determines that it is not a member of the group.

21 Claims, 5 Drawing Sheets

(56) References Cited

U.S. PATENT DOCUMENTS

| | | |
|---|---|---|
| 2002/0172186 A1 | 11/2002 | Larsson |
| 2003/0083046 A1 | 5/2003 | Mathis |
| 2003/0169769 A1 | 9/2003 | Ho et al. |
| 2003/0179750 A1 | 9/2003 | Hasty, Jr. et al. |
| 2003/0193950 A1 | 10/2003 | Philips et al. |
| 2003/0207692 A1 | 11/2003 | Goldberg |
| 2004/0029622 A1 | 2/2004 | Laroia et al. |
| 2004/0063442 A1 | 4/2004 | Goldberg |
| 2004/0137908 A1 | 7/2004 | Sinivaara et al. |
| 2004/0187112 A1 | 9/2004 | Potter |
| 2004/0190468 A1 | 9/2004 | Saijonmaa |
| 2005/0053033 A1 | 3/2005 | Kelly et al. |
| 2005/0073964 A1 | 4/2005 | Schmidt et al. |
| 2006/0164969 A1 | 7/2006 | Malik et al. |

OTHER PUBLICATIONS

Institute of Electrical and Electronics Engineers, Inc., 802.11n Working Group of the 802 Committee, Draft Amendments to Standard For Information Technology—Telecommunications and Information Exchange Between Systems—Local and Metropolitan Networks—Specific Requirements—Part 11: Wireless LAN Medium Access Control (MAC) and Physical Layer (PHY) Specifications: Enhancements for Higher Throughput, IEEE 802.11n/D1.0, Mar. 2006.

Kuppa, S., et al., "Modeling and Analysis of Frame Aggregation in Unsaturated WLANs with Finite Buffer Stations," ICC 2006, IEEE International Conference on Communications, IEEE 802.11-04/0889r44, vol. 3, Jun. 2006, pp. 967-972.

Lawrence, S., et al., "A Comparative Analysis of VoIP Support for HT Transmission Mechanisms in WLAN," ICDCSW 2007, $27^{th}$ International Conference on Distributed Computing Systems Workshops, IEEE 802,11-05/0149r1, Jun. 22-29, 2007, p. 6-6.

Nokia, et al., MMRA Joint Proposal, TGn Sync Alliance Email, Feb. 1, 2005.

LAN MAN Standards Committee of the IEEE Computer Society, "Information Technology—Telecommunications and information exchange between systems—Local and metropolitan area networks—Specific requirements—Part 11: Wireless LAN Medium Access Control (MAC) and Physical Layer (PHY) Specifications," ANSI/IEEE Std. 802.11, 1999 Edition (R2003) (Jun. 2003).

Institute of Electrical and Electronics Engineers, Inc., 802.11n Working Group of the 802 Committee, Draft Amendments to Standard For Information Technology—Telecommunications and Information Exchange Between Systems—Local and Metropolitan Networks —Specific Requirements—Part 11: Wireless LAN Medium Access Control (MAC) and Physical Layer (PHY) Specifications: Enhancements for Higher Throughput, IEEE 802.11n/D1.0, Mar. 2006.

LAN MAN Standards Committee of the IEEE Computer Society, "Information Technology—Telecommunications and information exchange between systems—Local and metropolitan area networks—Specific requirements—Part 11: Wireless LAN Medium Access Control (MAC) and Physical Layer (PHY) Specifications," ASNI/IEEE Std. 802.11, 1999 Edition (R2003) (Jun. 2003).

\* cited by examiner

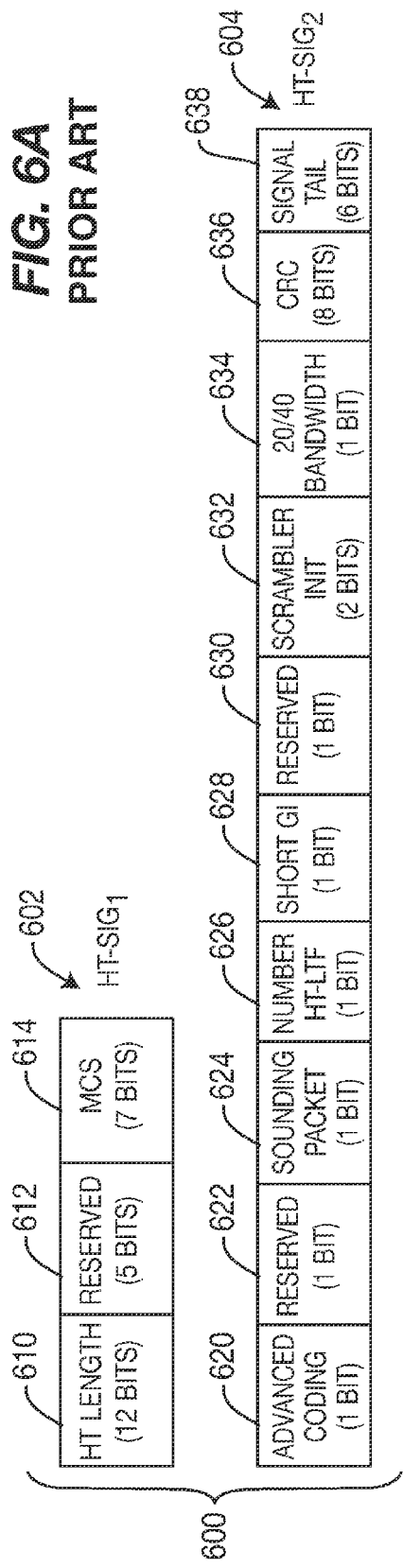
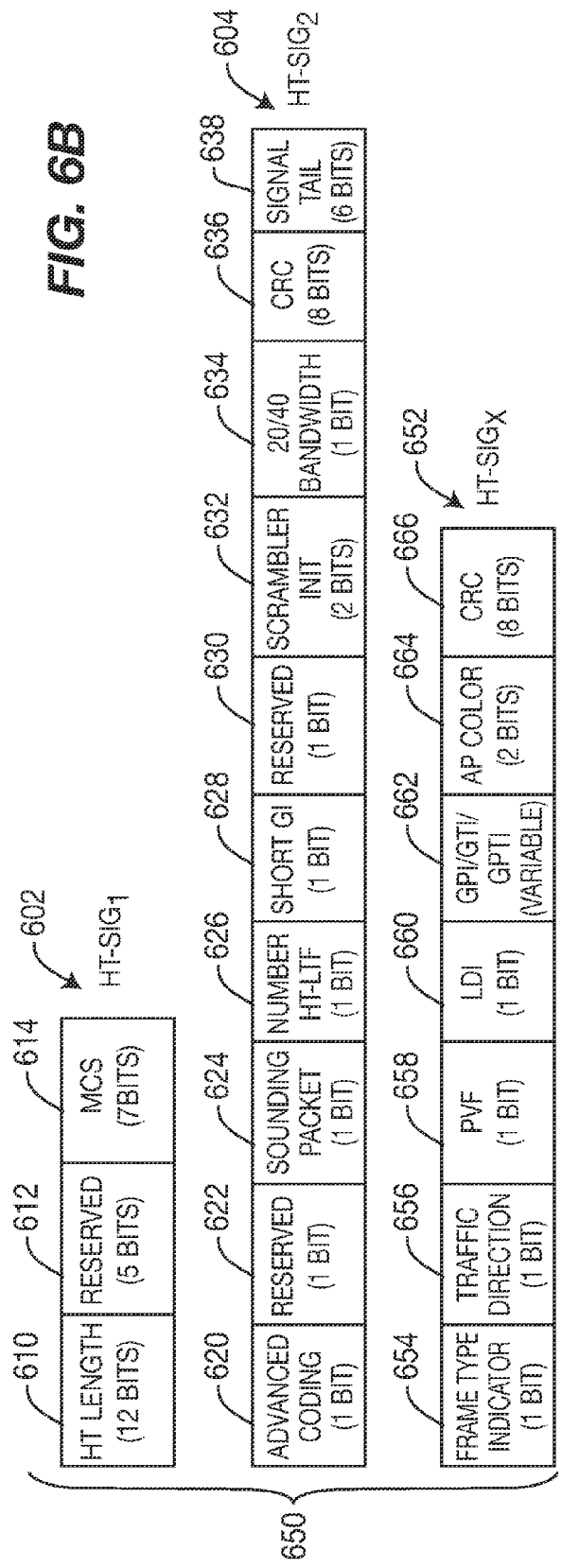

METHOD AND APPARATUS FOR EFFICIENT ADDRESSING AND POWER SAVINGS IN WIRELESS COMMUNICATIONS

CROSS REFERENCE TO RELATED APPLICATION

This application is a continuation of U.S. patent application Ser. No. 12/539,837, filed on Aug. 12, 2009, which issued on Mar. 1, 2011 as U.S. Pat. No. 7,899,462, which is a divisional of U.S. patent application Ser. No. 11/406,877, filed Apr. 19, 2006, which issued on Aug. 18, 2009 as U.S. Pat. No. 7,577,438, which claims the benefit of U.S. Provisional Patent Application No. 60/674,811, filed Apr. 25, 2005, the contents of which are herein incorporated by reference.

FIELD OF INVENTION

The present invention relates to wireless packet data communication systems in general, and in particular to a method and system for efficient addressing and power savings in wireless communication systems.

BACKGROUND

Frame aggregation and frame bursting are two proposed mechanisms for enhancing the performance of WLAN systems. Such mechanisms are under consideration for the 802.11n extension to the 802.11 WLAN standard, which will allow for higher throughput WLAN devices. Both TGnSync and WWISE proposals are considering various types of frame aggregation and frame bursting schemes.

FIG. 1 shows different types of frame aggregations and frame bursting schemes that were proposed by either TGn-Sync, by WWiSE, or by both. Aggregation schemes can generally be differentiated according to which parts of a packet they aggregate.

MSDU aggregation (100) aggregates one or more medium access control (MAC) service data units (MSDUs) 102 to form an aggregated MSDU (A-MSDU) 104, with each MSDU separated by a subframe header 106. A MAC header 108 is added to the A-MSDU to form a single MAC protocol data unit (MPDU) 110.

MPDU aggregation (120) aggregates one or more MPDUs 122 to form a single aggregated MPDU (A-MPDU) 124, with each MPDU separated by an MPDU delimiter 126. A physical (PHY) header 128, including a legacy training and SIGNAL field 130 and an HT Training and SIGNAL field 132, is added to the A-MPDU 124 to form a PHY protocol data unit (PPDU) 134.

PPDU aggregation (140) aggregates one or more PPDUs 142, each PPDU including a PHY header 144 and an MPDU 146. A PHY header 148, including a legacy training and SIGNAL field 150 and an HT Training and SIGNAL field 152, is added to form a single aggregated PPDU (A-PPDU) 154.

PPDU Bursting (160), also known as high-throughput (HTP) Burst Transmission, involves transmitting a sequence of frames 162 by a single high-throughput station (STA) in a single medium access. Each frame 162 includes a PHY header 164, having a legacy training and SIGNAL field 166 and an HT Training and SIGNAL field 168, and an MPDU 170. The frames 162 may be transmitted as part of an A-PPDU, or with reduced interframe spacing (RIFS) 172 to enhance medium efficiency.

Aggregation or bursting schemes can support either aggregating frames destined to a single receiver (i.e., a single WLAN destination), aggregating frames destined to multiple receivers (i.e., multiple WLAN destinations), or both. SRA is used to refer to Single Receiver Aggregation, while MRA is used to refer to Multiple Receiver Aggregation. For example, the MSDU aggregation scheme is typically used for SRA since it contains only one MAC header which can identify a single WLAN receiver address. On the other hand, the MPDU aggregation, PPDU aggregation, and PPDU Bursting schemes can either be used for SRA or MRA, since each MPDU within the aggregate or burst contains a MAC header which can identify a different WLAN receiver address.

Frame aggregation and bursting schemes have the benefit of increasing the efficiency and overall throughput of the WLAN system. A drawback is that most of the aggregation and bursting schemes are not presently supportive/friendly to the issue of saving power/battery. The main problem is that the duration of an aggregated frame or burst can be quite long. So if knowledge about which STAs' data (i.e., which WLAN destination addresses) are contained within an aggregated frame or burst is not provided upfront, then each STA within the WLAN will have to receive and decode the entire aggregated frame or burst in order to check if the frame or burst contains some data destined to the STA.

The act of receiving and decoding the information in such lengthy packets consumes a large amount of energy for the STA's receiver, and significant power/battery savings can be achieved if the receiving STA has some upfront knowledge to indicate that it should not listen to (receive and decode) a particular aggregated frame or burst if it is not an intended receiver.

By providing upfront knowledge about which STAs have data within the aggregated frame or burst, all STAs that do not have data within the aggregated frame or burst can achieve power savings by sleeping (i.e., not listening to or not decoding the full packet) during the duration of the aggregated frame or burst. On the other hand, STAs that do have data within the aggregated frame or burst may be able to achieve power savings if some more upfront information is provided. Such upfront information concerns the timing of the transmission of the STA's data within the aggregated frame or burst. The basic idea is that such STAs will utilize the upfront timing information to wake up (listen and decode) during the portion of the aggregated frame or burst that contains its data, and sleep during the remaining portions that do not contain its data, hence reducing its power consumption.

In prior art, there are some proposals to support power/battery savings. For example as shown in FIG. 2, the A-MPDU aggregation scheme 200 of the TGnSync proposal proposes using an MRAD (Multiple Receiver Aggregate Descriptor) as the first MPDU within an aggregated frame (A-MPDU) that is destined to multiple receivers. The PPDU 202 includes a PHY header 204 and an A-MPDU 206. The PHY header 204 includes a legacy training and SIGNAL field 208 and an HT Training and SIGNAL field 210. The A-MPDU 206 includes an MRAD MPDU 212 and a plurality of MPDUs 214, each separated by an MPDU delimiter 216.

The MRAD MPDU 212 is used in the following fashion. A STA that does not have data within the aggregated frame will receive and decode up until the end of the MRAD MPDU 212, and the STA learns that its receiver address is not included within the MRAD, it can go to sleep (i.e., disable its receiver) until the end of the aggregated frame. Since TGnSync requires that MPDUs destined to the same receiver address have to be placed contiguous to each other within the A-MPDU, a STA that has data within the aggregated frame will receive and decode data until it receives all of its MPDUs and detects a different receiver address in the next MPDU, at which point it can go to sleep (i.e., disable its receiver) until the end of the aggregated frame.

Even though the MRAD mechanism provides a way to achieve power savings in the case of MRA based on A-MPDU aggregation, the MRAD mechanism is appropriate for single-rate MRA aggregation but not sufficiently suited for Multiple-Rate MRA (where the aggregate MPDUs are sent at different rates), for PPDU Aggregation, nor for PPDU Bursting.

One proposal describes MMRA (Multiple-rate (or Multiple MCS) Multiple Receiver Aggregation), which relates to support for power savings that can be achieved when Multiple-rate MRA (MMRA) is used. That proposal includes using an MMRAD (MMRA Descriptor) which contains information on the STA IDs (i.e., receiver addresses) as well as timing offset information, which can be used for power savings. The MMRAD is defined within the MAC portion of the frame, and a single bit within the PHY portion of the frame (specifically within the HT-SIG field) is used to indicate the presence of an MMRAD.

The prior art proposals suffer from many drawbacks, such as: the length of the MRAD or MMRAD is large and inefficient, it is a variable length field, and implementation can be simplified by using only a fixed length packet. Also due to such a large field, the power saving information cannot be embedded within the PHY layer which should be maintained at a small size. Since the power savings information is sent at the MAC level, it is not sufficiently robust because the MRAD is sent at a rate that not all STAs may be able to decode. It is also a MAC MPDU, so if it is lost or if a STA cannot properly decode it, then there are no power savings. Another drawback is that timing information is not provided in an efficient manner. The current proposals mostly apply to A-MPDU aggregation, and cannot efficiently and robustly work with A-PPDU aggregation, PPDU bursting, MRMRA, or reverse direction traffic.

SUMMARY

The method method and apparatus may be applicable to frame aggregation schemes, frame bursting schemes, and to frames that are not aggregated (i.e., those sent to a single receiver for example). The method and apparatus may not be restricted to power and battery savings, but may also be used for other performance enhancing purposes, such as for providing addressing scalability via simplified group addressing, for use in packet scheduler design or implementation, or for use in various radio resource management functionalities.

A method and apparatus for addressing groups of STAs in wireless communications mayy assign the STAs in a system into a number of groups. Group information may be signaled to each STA and a group identifier may be indicated in a frame.

A method and apparatus for enabling power savings in wireless communications mayy assign the STAs in a system into a number of groups. Group information may be signaled to each STA and a group identifier may be indicated in a frame. A STA may enter a power saving mode on a condition that the STA determines that it is not a member of the group.

A method and apparatus for enabling power savings in wireless communications may indicate a traffic direction in a frame. The traffic direction may indicate the frame destination. The STA may enter a power saving mode on a condition that the traffic is not directed to the STA.

The method and apparatus may receive and decode a frame at a STA until the STA decodes a power saving indicator. The STA may enter a power saving mode on a condition that the power saving indicator indicates that the STA may use the power saving mode. The power saving indicator may be associated with group information.

The method and apparatus may transmit timing information to a STA in a portion of a frame. The STA may enter a power saving mode based on the timing information. The STA may exit the power saving mode based on the timing information, and may receive and decode a portion of the frame after exiting the power saving mode.

The method and apparatus may provide listening instructions for a frame. The listening instructions may include an indication of how much of a frame may be decoded by a STA that is not an intended receiver of the frame. The listening instructions may be included in the frame, which may be transmitted to a STA. The frame may be received at the STA and the listening instructions may be decoded. The frame may be decoded at the STA based on the listening instructions, wherein the STA may enter a power saving mode after decoding the portion of the frame indicated by the listening instructions.

The method and apparatus may transmit a first frame from a STA to an AP, including a request from the STA to opt out of a transmission type. At least one second frame may be transmitted from the AP. The STA may receive the second frame and decode the transmission type of the second frame. The STA may enter a power saving mode on a condition that the transmission type of the second frame is the transmission type that the STA has opted out from.

BRIEF DESCRIPTION OF THE DRAWINGS

A more detailed understanding of the invention may be had from the following description of a preferred embodiment, given by way of example, and to be understood in conjunction with the accompanying drawings, wherein:

FIG. 4 is an example of using group ID information in connection with timing information and STA sleep periods;

FIG. 5A is a diagram of a legacy PLCP header in an existing TGnSync PHY header;

FIG. 5B is a diagram of a legacy PLCP header including a frame type indicator;

FIG. 6A is a diagram of an existing HT-SIG field in the TGnSync PHY header;

FIG. 6B is a diagram of an HT-SIG field including an HT-SIG$_x$ field;

DETAILED DESCRIPTION OF THE PREFERRED EMBODIMENTS

Hereafter, the term "station" (STA) includes, but is not limited to, a wireless transmit/receive unit, a user equipment, a fixed or mobile subscriber unit, a pager, or any other type of device capable of operating in a wireless environment. When referred to hereafter, the term "access point" (AP) includes, but is not limited to, a base station, a Node B, a site controller, or any other type of interfacing device in a wireless environment.

The present invention applies to a variety of different technologies, including aggregated frames, non-aggregated frames, reverse direction schemes, multiple responders' schemes such as MRMRA (i.e., Multi-Response MRA), reverse direction traffic, multi-poll, and MRMRA Multi-poll (MMP). Hence, the scope of power savings as defined by the present invention can cover frames that are standalone, are not aggregated, or are single-receiver aggregated, all types of aggregated frames or bursts, and all schemes that can have multiple responders or use multi-poll.

Group Addressing of STAs

The present invention provides an efficient way of addressing groups of STAs. The current art schemes for addressing WLAN STAs are not efficient for use in limited-size headers, such as the PHY (physical layer) header since they require many bytes. Basically, the current WLAN systems and methods do not allow for the efficient addressing of STAs at the PHY (physical) layer or even the MAC (medium access control) layer.

The present invention proposes a new efficient scheme for group addressing of STAs, and can be used in WLAN headers with limited size. This group addressing scheme can be used by various performance enhancement functions, such as power saving, radio resource management, improving QoS (Quality of Service), and packet scheduling (packet scheduler design and implementation). It may also be used to uniquely identify the final traffic destination (e.g., the receiving WLAN STA) when the number of STAs is small enough. In a WLAN, efficient addressing can be achieved by having an AP (access point) organize the STAs it is servicing (e.g., those STAs that are associated with the AP) into different groups, with each group capable of containing multiple STAs. The terminology "Power Saving Groups", "Station Groups", or "Address Groups" can be used to refer to such groups.

Figure 1:
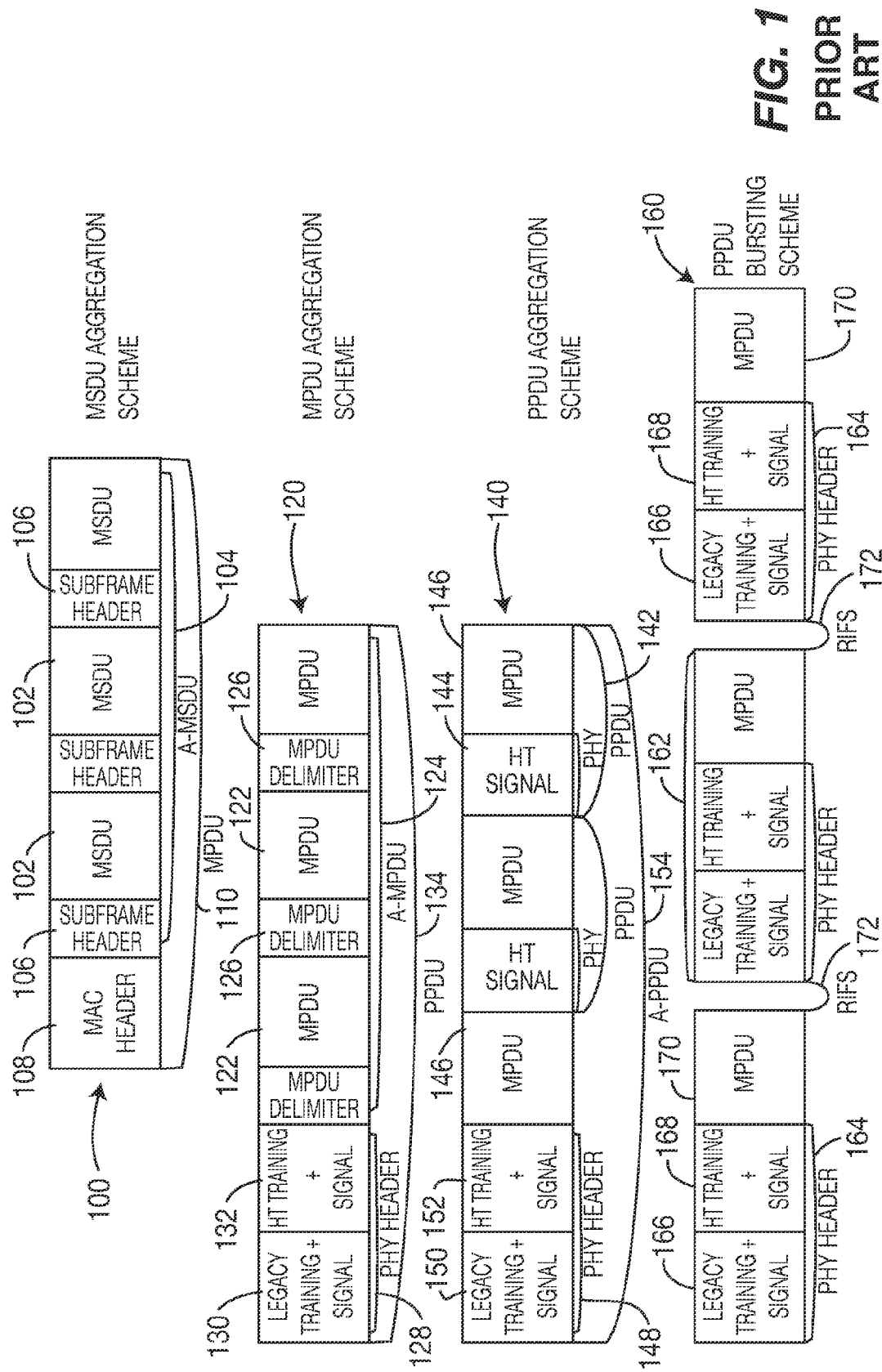
FIG. 1 is a diagram of several existing frame aggregation and bursting schemes.
Figure 2:
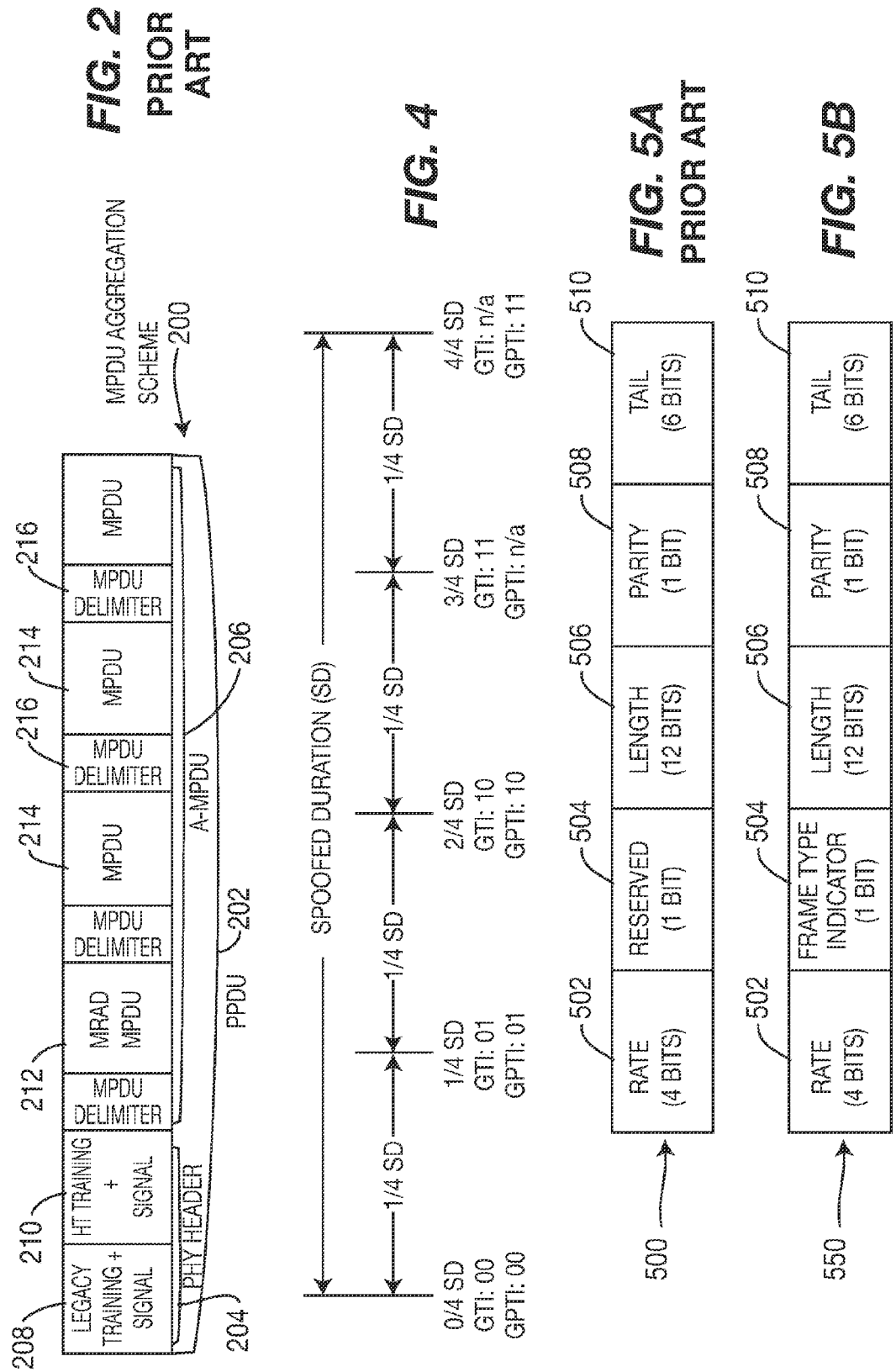
FIG. 2 is a diagram of an existing MPDU aggregation scheme using an MRAD.
Figure 3:
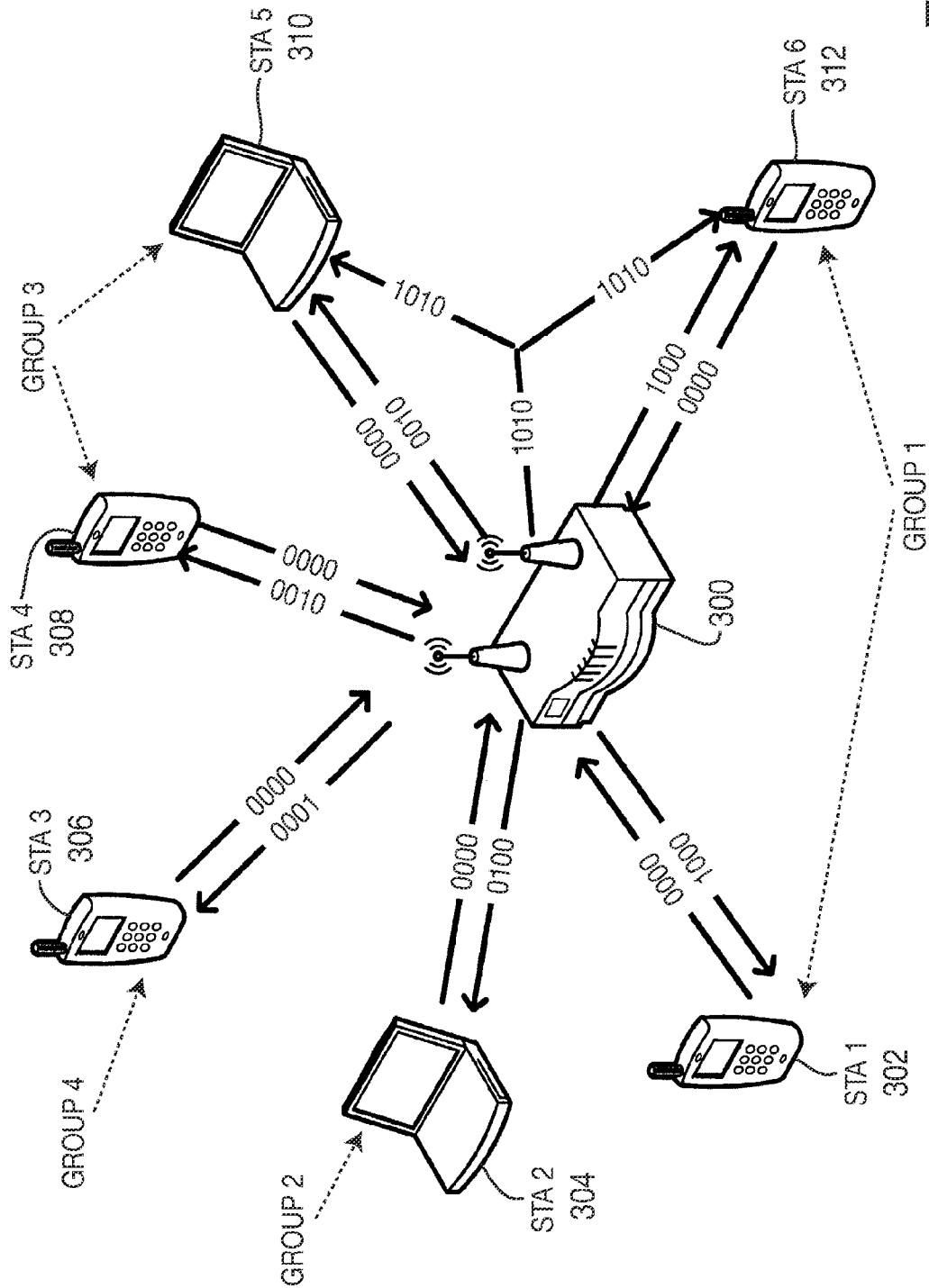
FIG. 3 is a diagram of grouping STAs and group communications with an AP.

While a WLAN STA is typically uniquely identified by its MAC address, performance enhancements and power savings can be achieved without the need to specify the full MAC address or parts of the MAC address of the STA. Instead, a "group address," a "group identifier," a "group indicator," or a "group number" can be used to enable power savings. For example as shown in FIG. 3, assume that an AP 300 would like to organize the six STAs (302-312) that it is servicing into four groups. One possibility is for the AP 300 to assign STA #1 (302) and #6 (312) to group 1, STA #2 (304) to group 2, STA #4 (308) and #5 (310) to group 3, and STA #3 (306) to group 4. It is also possible for the AP 300 to place one STA in multiple groups. In FIG. 3, STAs #5 (310) and #6 (312) both belong to groups 1 and 3.

Once the AP 300 decides to assign a STA to one or more groups, it can use any form of messaging to signal the assigned group or groups to the STA. For example, when STA #6 (312) is associating with the AP 300 and once the AP has decided to assign or classify STA #6 as part of group 1, the AP can use a management frame, action frame, control frame, or data frame to indicate to STA #6 that it has been assigned into group 1. Such signaling can be conducted in a variety of ways, for example, by introducing new fields within the association or re-association frames; existing management or action frames (e.g., those used for block acknowledgement (ACK) setup, traffic stream setup, or direct link protocol (DLP) setup); control frames such as ACK, block ACK request (BAR) and block ACK (BA), initiator aggregation control (IAC)/responder aggregation control (RAC), modulation coding scheme (MCS) Request and MCS feedback; and the data frames.

Some sort of ACK (feedback) may be used, whereby a STA confirms that it has correctly received its new group assignment. The group assignment and its subsequent confirmation (through feedback or ACK) can be signaled within any existing WLAN frame or by defining new frames. The AP can classify itself as part of a special group on its own, as part of no group, as part of any group that may contain other STAs, or as part of every group. The AP may also communicate its assigned group to the associated STAs.

The AP can belong to a default group (e.g., a fixed value) that all STAs are aware of (for example, a group that is identified by all 0's or all 1's; in FIG. 3, the AP belongs to group 0). A STA that has not yet been assigned into a group by the AP can assume that it is, by default, part of all possible groups (e.g., a STA belongs to every group until it has been assigned into a specific group). Also, within the specific context of Direct Link Setup or Direct Link Protocol (DLS or DLP), the AP may communicate to a STA the group ID it should use when talking directly to another STA (e.g., which could be the group that the other STA is assigned into) or alternatively a default group may be used for such purpose.

The groups' assignment, re-assignment, or signaling can be conducted at any point of time that the AP or STA deem necessary, and is not restricted to specific phases such as negotiation or association. Static assignments can also be used, whereby an operator or user configures and organizes the STAs and AP into the necessary groups, and inputs that information into the STAs or APs. Also, distributed algorithms may be devised for assignments, whereby a STA assigns itself into a group on its own, using no or little explicit communication/signaling.

Multi-dimensional groups can be defined, which can be interpreted as having sub-groups within groups. For example, a STA can be assigned to group 1 and sub-group 2. The sub-group concept can be useful to differentiate between the multiple STAs that belong to the same group. For example, if group 1 contains three STAs and there are four available sub-groups within group 1, each of the three STAs can be put into a different sub-group, thereby providing further differentiation between the STAs within the group. Therefore, a more general case is to assign to a STA one or more values, with each value representing a group, a sub-group within a group, and sub-sub-group within a sub-group, etc. The more general case is to have N dimensions of groups, which can be identified by the N-tuple (g1, g2, . . . , gN), and a STA will be assigned N values, one value for each of the N dimensions (i.e., a combination of groups).

Groups may also be defined by taking into account other characteristics. For example, one group could identify that broadcast traffic is contained within the frame and will effectively contain all STAs within the AP coverage area. If the AP would like to send an aggregated frame that contains broadcast traffic and traffic belonging to group 2, it can use group 0 to indicate that there is broadcast traffic destined to all STAs, and can use group 2 to indicate that there is traffic for at least one STA in group 2. This concept is especially useful when the data within the aggregated frame is ordered by traffic type; for example, broadcast traffic and/or multicast traffic is placed before unicast traffic within the aggregated frame. A broadcast group can be used to represent that the data type is broadcast traffic destined to all STAs.

Similar concepts can apply for multicast traffic, by having one or more groups indicating multicast traffic. One group can indicate that both or either of broadcast and multicast traffic is present within the frame (i.e., a single group to represent both broadcast or multicast). The frame type information can be used in defining the groups. For example, one group may be used for management, action, or control types of frames. Additionally, QoS related information can be used when defining the groups.

There are many possible algorithms that can be used for organizing the STAs and/or different traffic types into the available groups. One algorithm is to use a subset of the bits of the index of the memory table (e.g., the RAM table) where the entry containing the MAC address of the STA is located. Since an AP probably maintains a lookup table of its associated STA's MAC addresses, the AP can use the Least Significant Bits of the table index where a STA MAC address is stored in RAM. A second algorithm is to apply a hashing function on the MAC address of the STA (as well as other characteristics of the STA and traffic if desired). A third algorithm is to monitor (measure) the load (i.e., traffic utilization) on each of the groups (or their STAs), and dynamically change the group assignment in such a way that will produce a nearly equal load among all groups. A fourth algorithm selects the least utilized group (in terms of traffic utilization) to assign to a newly associated STA. Other algorithms include attempting to split/balance the load/usage among all groups, and may take into account other factors, such as packing/grouping those STAs that have similar frame aggregation requirements, use similar data rates or power levels, or have similar QoS or radio resource management requirements, within the same group.

Signaling the Group Assignment Information

As described previously, management, action, control, or data frames can be used for signaling the assigned group to a STA, the group of another STA, or the AP's group. For example, IAC/RAC, RTS/CTS, MCS request and feedback, BAR/BA, Association/Re-Association Request and Response frames, or CF-Poll or QoS Poll, could be used for such signaling purposes. The signaling may consist of a group assignment message which contains a flag to indicate that this is a group assignment message, and a value (encoded as a bitmap or in other form) of the newly assigned group or groups. The assignment message may also contain information on the scope of the assigned group or groups, for example, whether the assigned group is applicable for this STA, for the AP, or for another STA (e.g., when doing DLP).

Once a STA correctly receives a group assignment message, it may confirm via a group ACK message back to the AP that it has correctly received and accepted the newly assigned group or groups. Alternatively, the STA can periodically confirm in an unsolicited manner the group or groups it is using for each of the different communication scopes, by sending a group confirmation or ACK message.

Re-Assigning STAs to Different Groups

A STA can also request a group re-assignment, if it is not satisfied with the group it is currently assigned to. For example, a STA measures its battery level, and if it is short on power (i.e., when certain thresholds are crossed), it can tell the AP via a message that it is low on power, and that it would like to request a group re-assignment. The STA may specifically include a measure of its battery power level within such request. Upon receiving the message, the AP may decide to deny or accept the STA's request and may assign the STA into a new group. A STA can indicate to the AP during a negotiation, setup, or any signaling phase, via a management, action, control, or data frame, whether or not it has the capability to use the power saving group information for the purpose of saving power, since such indication can be helpful for the AP in designing and organizing its groups.

Power Saving Group Information

The information proposed for use in realizing power savings, in simplified or scalable addressing, in scheduling frames (scheduler implementations), for any radio resource management functions, or for any other performance enhancement functions, is generically referred to as "power saving group information". The use of such information is not restricted to power savings, but can be used for other purposes, such as data scheduler implementations; grouping STAs with similar aggregation requirements (i.e., those frames that are likely to be aggregated together), similar data rate, similar power, or similar QoS requirements within the same group; and various radio resource management functions. Some or all frames usable by the WLAN can contain all or some pieces of the power saving group information within the frame header (PHY or MAC header), the body of the frame, or any previously sent frames (e.g., RTS/CTS, IAC/RAC, CF-Poll, or QoS-Poll). The power saving group information can consist of one or more of the following pieces of information.

Presence or Validity Flag (PVF)

A field (or bit) used as a flag (herein referred to as a flag) to indicate whether at least one piece of the power saving group information is present in the frame (e.g., within the frame header). For example, the PVF can be used to indicate whether there is power saving information within the frame or not. In the case where every frame is supposed to contain the power saving information, such a flag may not be necessary. The flag may be used for implementing variable-length PHY or MAC header fields or headers.

For example, the flag can indicate whether an extended portion of the header is present or not, wherein the header extension contains all or some power saving information. A bit can be used within the SIGNAL field of the PHY header (e.g., within the HT-SIG field or the SIGNAL-N field) to indicate that one (or more) additional OFDM symbols is provided within the HT-SIG field, and such additional OFDM symbols contain fields that provide all or some power saving information. In another variant, the flag can be used to indicate the availability or validity of the power saving information fields that are contained within the usual (mandatory) OFDM symbols of the SIGNAL field, without the need for an extra OFDM symbol. Another use of the PVF (e.g., by using another bit) may be to indicate if the power saving group information is valid or not.

Group Presence (or Absence) Indicators (GPI)

A frame contains information that identifies the group or groups of STAs that the frame is destined to. The GPI is applicable to standalone frames, aggregated frames, a burst transmission, or a sequence of frames. For example, one form of specifying and encoding the GPI information is by using a bitmap (or a mask). Returning to the previously described four groups example, the GPI field can be defined as the bitmap consisting of four bits (b1, b2, b3, b4), whereby the value of b2 indicates whether the frame contains data for at least one STA assigned into group 2. To illustrate, when an AP sends data to a single STA that is part of group 2, the AP can use the bitmap 0100 to indicate that a STA belonging to group 2 has some data present in the sent frame, while such frame contains no data belonging to the other three groups.

Alternatively, the group can be defined using regular encoding (e.g., 10), to indicate that this frame includes data destined to a STA belonging to group 2.

As another example, when an AP sends data to STAs using an aggregated frame (e.g., when using MSDU aggregation, MPDU aggregation, PPDU aggregation, PPDU Bursting, MRMRA, or Multi-Poll), a bitmap value of 0110 indicates that the frame contains data for at least one STA in group 2 and at least one STA in group 3, and that the frame does not contain data for group 1 or group 4. It is noted that even though this example assumes four groups, any number of groups can be used and the bitmap is expanded to accommodate the number of groups used. Further, the number of groups used can be presented as a dynamic variable. The GPI can be contained within the frame header, the PHY header, the MAC header, the SIGNAL field (legacy SIGNAL, HT-SIG, or SIGNAL-N) of the PHY header, the MAC header, the MRAD, an MMP, or any multi-poll frame.

Group Timing Information (GTI)

In the case of multiple-receiver aggregation, providing GTI can lead to higher power savings for those STAs that are aggregated within a frame. GTI may not be needed by STAs which are not part of the aggregated frame, since they can still achieve power savings by using the GPI.

To illustrate how GTI can be used, consider the previous example where the bitmap value 0110 was used to indicate that the aggregated frame contains data for at least one STA in group 2 and at least one STA in group 3. Assuming that the data for a given group is contiguous within the aggregated frame, timing information can be provided which identifies the time at or near which group 2's data will start being transmitted, and also identifies the time at or near which group 3's data will start being transmitted.

The GTI allows a group to sleep (i.e., not receive or decode) the data until the time at which the first piece of data for that group is transmitted, hence achieving power savings in between. The power savings may be attained since the receiving STA can sleep once it receives its data and detects a change in receiver address in the next piece of data in the aggregated frame.

In order to provide the GTI, the start time for each group within the frame (e.g., in the form of a time offset) is provided. This information is the time at or near which the first piece of data belonging to any STA within the group starts getting transmitted. In order to provide the GTI efficiently, instead of fully specifying (encoding) the individual group start times (or offset times), a base duration (i.e., base period) that applies to all groups can be used and a different fractional value to identify the start time (e.g., the time offset) can be used for each group. For example, assuming that the base duration is 16 time units, then by using two bits, the group start time could be encoded and communicated as the fraction ¾, which means that the group start time (e.g., the group time offset) is (¾×16=) 12 time units either from a reference point in time.

The base duration information can be derived from existing fields within the WLAN frame header. For example: the RATE and LENGTH fields within the Legacy SIGNAL field of the PHY header; the HTLENGTH and the MCS fields within the HT-SIG (SIGNAL) of TGnSync's frame header; or the Length and Config fields within the SIGNAL-N (SIGNAL) field of WWiSE's frame header can be used to derive the base duration information. The base duration can be the same as the Spoofed Duration that is derived from the PHY header information. Using the Spoofed Duration (or any variant that can be derived from it) as the base duration can provide an efficient method for encoding the timing (e.g., offset) information. Alternatively, the MAC header's DURATION/ID field can be used to derive the base duration information.

An example of using the timing information based on the Spoofed Duration (SD) and GTI coding is shown in FIG. 4. The GTI indicates when the STA should begin listening to the medium, and in FIG. 4 the coded GTI is given in ¼ intervals of the SD. The coding for the GTI used in FIG. 4 is described in Table 1. It is noted that while Table 1 describes the GTI coding in terms of the SD, any type of frame duration can be used to encode the GTI.

TABLE 1

Example of GTI coding

| GTI value | When the STA begins listening |
|---|---|
| 00 | at the beginning of the SD |
| 01 | at ¼ of the SD |
| 10 | at ½ of the SD |
| 11 | at ¾ of the SD |

A new field could be added to the PHY or MAC headers of the WLAN frame, specifically for the purpose of specifying the base duration information. The base duration can correspond to either the full duration of the frame or a partial duration of the frame. In the case of PPDU bursting or PPDU aggregation, the base duration can be defined as the full duration of the PPDU burst (i.e., the base duration covering multiple frames) or the aggregated PPDU frame, in addition to defining the base duration as the duration of a single PPDU (or frame). Similarly, in MRMRA, reverse direction traffic, multi-poll, or MRMRA schemes, the base duration may cover the whole duration of the sequence of frames being exchanged.

Aside from the base duration information, the fraction value for each group needs to be specified. The fraction value is multiplied by the base duration to obtain the actual transmission start time for the group (e.g., the transmission time offset for the group). Assuming a fixed reference denominator, then only the numerator's value need to be specified and communicated. For example, assuming a denominator of four, then two bits could be used to provide the GTI.

Again taking the example of a GPI of 0110 indicating that groups 2 and 3 are present, one possible way to encode the GTI is to have two bits per group, so the GTI consists of eight bits (b1, b2, b3, b4, b5, b6, b7, b8), whereby the value of bits b1 and b2 provide the numerator value for group 1 (which may not be necessary in this example, since GPI indicates that group 1 is not present), while b3 and b4 provide the numerator value for group 2, and so on. As an example, in order to obtain the time offset information at or near which group 2's transmission will start, one has to multiply the base duration by the value of 'b3 b4' and divide by four. The time offset information is generally interpreted as the time at or near which a STA will start listening to the frame, when such frame contains data for that STA (i.e., when the STA's group is present within the frame).

The GTI can be contained within the frame header; the PHY header; the MAC header; or the SIGNAL field (legacy SIGNAL, HT-SIG, or SIGNAL-N) of the PHY header, the MAC header, the MRAD, the MMP, or any multi-poll frame. The GTI does not have to be contained in the same location as the GPI. For example, the GPI can be included within the PHY header, while the GTI can be included within the MAC header (e.g., within the MRAD or MMP).

Group Presence and Timing Information (GPTI)

Even though GTI and GPI information has been defined as two separate fields, they can be merged together and define the two types of information within one field (GPTI), by encoding both the presence and timing information using a pre-defined mapping. There are various ways of encoding the two pieces of information together, as shown in FIG. 4 and in Table 2.

TABLE 2

Example of GPTI coding

| GPTI value | When the STA begins listening |
| --- | --- |
| 00 | at the beginning of the SD |
| 01 | at ¼ of the SD |
| 10 | at ½ of the SD |
| 11 | at the end of the SD |

With the values 01, 10, and 11, the STA can sleep until it is time to listen to the medium, thereby saving power. The special case of a 11 can indicate that the group is not present, since the STA will start listening at the end of the SD and will sleep throughout the whole frame body transmission. The GPTI can be contained within the frame header, the PHY header, or the MAC header. The GPTI can be contained within the SIGNAL field (legacy SIGNAL, HT-SIG, or SIGNAL-N) of the PHY header, the MAC header, the MRAD, the MMP, or any multi-poll frame.

AP Color (APC), Cell Color, or AP Coverage Area Color

In a system where there are multiple APs that may use the same frequency channel, it is possible for STAs within a given cell (i.e., an AP coverage area) to listen to frame transmissions occurring in another nearby or adjacent cell. In order to extract better power savings performance in such cases, the WLAN frame can contain an AP identification, which can be referred to as an "AP color" or "AP Group" or "Cell Color" or "Cell ID". The AP color (APC) is not necessarily a unique identification of the AP. For example, if AP1, AP2, and AP3 are close to each other and are using the same frequency channel, then by using two bits to identify APC, AP1 can be assigned a color of 11, AP2 a color of 01, and AP3 a color of 00. The APC can be contained within the frame header, the PHY header, the MAC header, the SIGNAL field (legacy SIGNAL, HT-SIG or SIGNAL-N) of the PHY header, the MRAD, the MMP, or any multi-poll frame.

STAs that are being serviced by AP1 will be able to save power by not decoding further information in frames that contain a different APC in the frame header (e.g., STAs associated with AP1 save power by not listening to or decoding frames that contain 00, 01, or 10 as their APC). The APC can lead to further power savings at the multi-AP system level, but even without it, power savings can still be achieved using the previously described methods.

Listening Directions or Instructions (LDI)

Listening Directions or Instructions (LDI) describe what needs to be read, decoded, or interpreted. In some cases, a WLAN STA that is not an intended receiver of the frame (i.e., whose data is not contained within the frame) may still need to read and decode the frame in order to extract certain information. For example, the STA may need to update its locally stored NAV Duration value, and for that it may need to decode as far as the Duration/ID information in the MAC header of the frame. Alternatively, the STA can rely on the information of the PHY header (e.g., LENGTH and RATE, MCS, or Config fields) to update its NAV Duration values.

The sender of the frame can specify using a field (e.g., a bit or few bits) in the header whether the receiving STA is required to read and decode all or some of the MAC header information even if it is not the intended receiver of the frame. The sender can also specify using another field whether a receiving STA shall update its locally stored NAV Duration value based on the information contained in the legacy PHY header (e.g., the legacy SIGNAL field), in the high throughput (i.e., 802.11n) PHY header, or in the MAC header (e.g., Duration/ID field of the MAC header).

Some implicit rules can be used to derive whether the Duration/ID field of the MAC header (or the whole MAC header in general) needs to be read or not. One rule compares the spoofed duration using the legacy PHY SIGNAL field with the spoofed duration using the high-throughput PHY HT-SIG (or SIGNAL-N) field. If there is a certain amount of difference between the two, then that difference could be interpreted as an indication to read and decode further into the MAC header.

Also, as an explicit LDI, a field (e.g., one bit) within the PHY header can indicate whether a STA can sleep immediately, or shall not sleep but keep listening until it decodes the first MAC header (or some pieces of MAC information) and then sleep. Such explicit instructions regarding how far to listen into the frame can be further extended to provide instructions on where/when (e.g., at what event/field or at what time) to stop listening: e.g., immediately, ASAP, after decoding the MAC header, after decoding the first MPDU, after decoding the MRAD, etc.

Traffic Direction

Power savings may also be obtained by knowing the direction of the traffic. For example, if a given STA is sending traffic to the AP, it marks in the frame header that the data is destined to the AP. STAs can use this information to achieve power savings since they can sleep during other STA's transmissions to the AP, by looking at this "traffic direction" (TD) field or bit. Within the MAC header, and more specifically within the Frame Control field of the MAC header, there are "To DS" and "From DS" fields that can be used to identify the direction of the traffic. Such information can also be used for the purpose of achieving power savings. Additionally, a new TD field can be located in the PHY header of the frame for the specific purpose of identifying the direction of the traffic. The TD field can be located within the SIGNAL field (legacy SIGNAL, HT-SIG, or SIGNAL-N) of the PHY header. The advantage of this simple scheme is that it does not require specific new signaling to establish the groups (one group consists of the AP as the receiver, while the other group consists of all STAs as receivers).

Opting Out of Aggregation and Bursting Schemes

A STA can signal to the AP that it prefers not to be part of certain schemes that can make the STA consume too much power, such as a specific aggregation or bursting scheme or schemes, thereby contributing to power savings for the STA. For example, the STA can indicate using a frame (a management, action, control, or data frame) that it does not want data destined to it to be part of an aggregated frame. If the AP agrees to such a request and confirms agreement back to the STA, then the STA can save power by sleeping when it detects that a frame is making use of certain schemes. For example, upon detecting that a frame is aggregated (by using information in the SIGNAL field, e.g. HT-SIG field) the STA can sleep during the aggregated frame.

The STA can signal using a frame that it does not want data destined to it to be part of specific types of aggregation, such as multiple-receiver aggregation (MRA). In that case, the STA can sleep during frames that contain multiple receiver aggregates. Similarly, a STA can request that it does not want data destined to it to be part of MPDU or PPDU aggregation, but that it agrees to be part of MSDU aggregation. Some fields in the frame header (e.g., in the SIGNAL field) can be used to indicate the exact type of aggregation scheme(s) that the frame contains. A STA can sleep for the duration of a frame once it detects that it is not supposed to listen to the frame since the frame will not contain the STA's data. A STA can negotiate whether it supports or prefers the reception of aggregated frames (to multiple destinations or a single destination). A STA can perform the negotiation by sending the information as part of a feature list, a capability list, or a preference list via a management, action, control, or data frame. The STA can send this frame before association, immediately after association, at some later time after association, or at any other time.

The message can also be generated dynamically, for example by having the STA monitor its battery level and upon crossing certain thresholds and sending a request to the AP to be excluded from schemes that are more power costly (e.g., certain aggregation schemes). The STA may also indicate the amount of its remaining power within the message, and what types of aggregation schemes it prefers to be excluded from or alternatively included in.

Frame Type Indicator

The use of the unused reserved bit within the Legacy PHY SIGNAL field (L-SIG) may also be utilized as a flag for identifying non-legacy frame transmissions, such as 802.11n frames. This field can be used for enabling power savings for new implementations (new releases) of legacy devices, since STAs can sleep during those frame transmissions that are non-legacy (e.g., during 802.11n frame transmissions).

Sleep Timer

In order to prevent a deadlock situation, in which a STA remains asleep for a long period due to an erroneous condition, a timer mechanism can be implemented at the STA which starts when the STA enters a sleep mode. If the STA is sleeping for more than a predetermined time period (a configurable parameter), it will wake up upon expiration of the timer and start listening to the medium again, since it may have been in a deadlock condition.

Location of the Power Saving Group Information

Any piece of the power saving group information (PSGI) can be included within any type of WLAN frame, and within any part of the WLAN frame. PSGI can be included within the PHY header (e.g., the SIGNAL field), the MAC header, the body of the frame, or the tail of the frame. Some pieces of the PSGI can be included in a certain location in the frame (e.g., within the PHY header), while some other pieces of the PSGI can be located elsewhere in the frame (e.g., within the MAC header).

For frames that are part of a PPDU aggregate or PPDU burst, the PSGI can be included in the middle of the aggregated frame or burst, for example in the middle frame's PHY signals (headers), MAC signals (headers), mid-ambles, or delimiters. Also, for schemes such as MRMRA, reverse direction traffic, multi-poll, and MMP, some pieces of the PSGI can be included in the WLAN frames and in the MRAD or MMP. Adding some of the proposed PSGI in such schemes can increase their efficiency (for example, via efficient encoding of timing information) and potentially improve their performance.

FIG. 5A is a diagram of a legacy PLCP header 500 in an existing TGnSync PHY header. The PLCP header includes a rate field 502, a reserved field 504, a length field 506, a parity field 508, and a tail field 510. Because the PLCP header 500 is located early in a frame, it would be an efficient location (in terms of power savings for a receiving STA) for one of the PSGI fields.

FIG. 5B is a diagram of a legacy PLCP header 550 including a frame type indicator field 552. The fields 502 and 506-510 are the same as in the header 500. As the frame type indicator is one bit and the PLCP header has one reserved bit, the PLCP header is a suitable location.

FIG. 6A is a diagram of an existing HT-SIG field 600 in the TGnSync PHY header. The HT-SIG field 600 includes an HT-SIG1 portion 602 and an HT-SIG2 portion 604. The HT-SIG1 portion 602 includes a length field 610, a reserved field 612, and a MCS field 614. The HT-SIG2 portion 604 includes an advanced coding field 620, a first reserved field 622, a sounding packet field 624, a number HT-LTF field 626, a short GI field 628, a second reserved field 630, a scrambler initialization field 632, a 20/40 bandwidth field 634, a CRC field 636, and a signal tail 638.

FIG. 6B is a diagram of an HT-SIG field 650 including an HT-SIGx portion 652; the HT-SIG1 portion 602 and the HT-SIG2 portion 604 are the same as in the HT-SIG field 600. The HT-SIGx portion 652 includes a frame type indicator field 654, a traffic direction field 656, a PVF 658, an LDI field 660, a GPI/GTI/GPTI field 662, an AP color field 664, and a CRC 666. It is noted that while the HT-SIGx portion 652 is shown with all of the PSGI fields, the HT-SIGx portion 652 can be constructed with any number of the PSGI fields without affecting the performance of the present invention. In addition, the order of the PSGI fields shown is merely exemplary, and one skilled in the art could rearrange the order of the fields without affecting the operation of the invention.

Alternatively, the reserved field 612 in the HT-SIG1 portion 602 and the first reserved first 622 and second reserved field 630 in the HT-SIG2 portion 604 can be used for the PSGI. The PSGI fields can be spread out and placed into the reserved fields in their present locations, or the reserved fields could be rearranged to form a contiguous space for the PSGI fields.

Figure 7A:
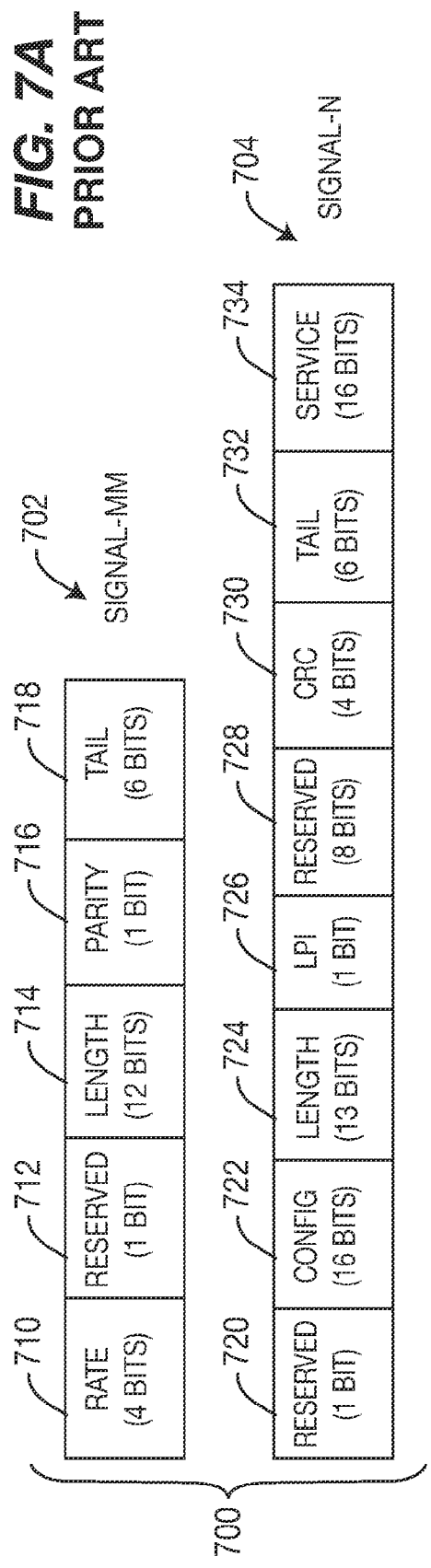
FIG. 7A is a diagram of existing SIGNAL-MM and SIGNAL-N fields in a WWiSE PHY header.

FIG. 7A is a diagram of an existing SIGNAL-MM field 702 and an existing SIGNAL-N field 704 in a WWiSE PHY header 700. The SIGNAL-MM field 702 includes a rate field 710, a reserved field 712, a length field 714, a parity field 716, and a tail field 718. The SIGNAL-N field 704 includes a first reserved field 720, a configuration field 722, a length field 724, an LPI field 726, a second reserved field 728, a CRC field 730, a tail field 732, and a service field 734.

Figure 7B:
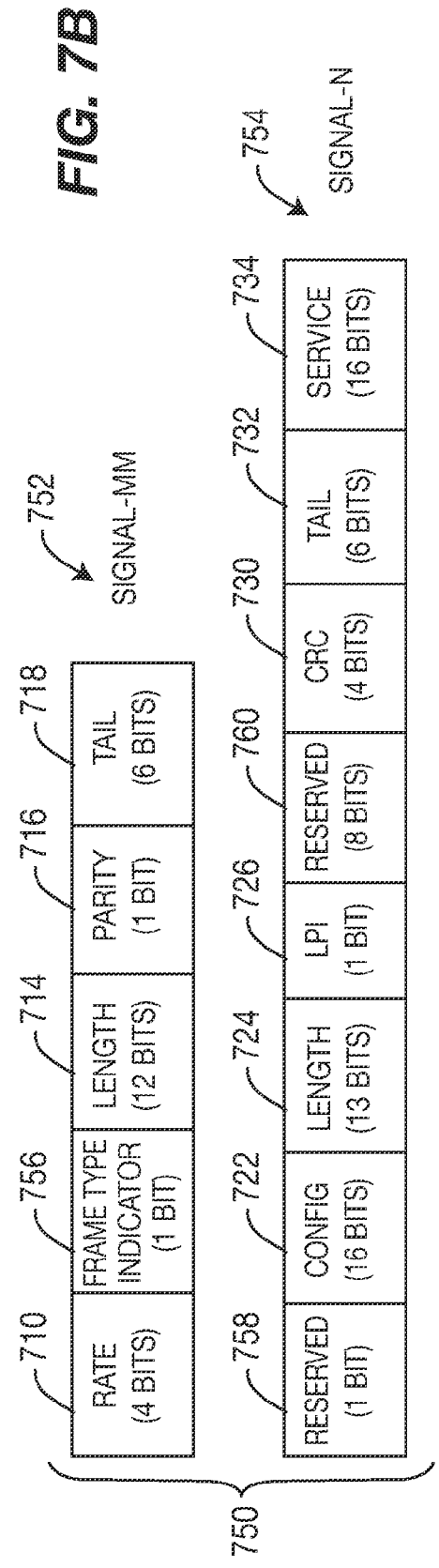
FIG. 7B is a diagram of SIGNAL-MM and SIGNAL-N fields including additional information fields.

FIG. 7B is a diagram of a SIGNAL-MM field 752 and a SIGNAL-N field 754 in a WWiSE PHY header 750. The PSGI fields can be placed in the existing reserved fields 712, 720, and 728. As shown in FIG. 7B, a frame type indicator field 756 can be placed in the SIGNAL-MM field 752, and some of the other PSGI fields can be placed in the SIGNAL-N field 754 at locations 758 and 760. It is noted that the fields 758 and 760 could be rearranged in the SIGNAL-N field 754 to for a contiguous space for the PSGI fields.

Verifying Power Saving Group Information

The integrity (correctness) of the power saving group information can be protected via a checksum (e.g., CRC) or parity computation. The CRC can be a newly defined field within the frame header, or can be an existing checksum or CRC field (e.g., the CRC within the HT-SIG or SIGNAL-N field) within the PHY or MAC headers. The CRC can be derived solely from all or parts of the power saving group information, or can be derived from some other information within the frame header as well as the power saving group information.

Even though most of the descriptions and examples spoke of aggregated frames, all such descriptions and examples can similarly apply to a burst of frames or a sequence of frames, as in PPDU Bursting, MRMRA, Polling, Multi-Poll, or Multi-Poll MRMRA schemes.

The inventions disclosed herein are applicable to any WLAN system context, such as BSS, ESS, IBSS, to WLAN mesh networks, and to WLAN ad-hoc networks. The small difference within such networks and the one generally described and used as an example is that if the AP is not present as a node within such networks, then any STA can provide the functionalities which were attributed to the AP. It is also possible that many WLAN STAs cooperate together in order to realize the functions and methods of the inventions, without needing an AP.

The present invention is not limited only to WLAN systems or networks, or only 802.11-based WLAN systems. The invention can be used and applied in any wireless communication system, such as other WLAN technologies or standards, as well as in other cellular communication systems, including UMTS, WCDMA, CDMA2000, HSDPA, HSUPA, or 3GPP LTE. The invention can also apply and be used in wide area wireless networks, such as 802.16.

What is claimed is:

1. A wireless station (STA) comprising:
   a receiver configured to receive an indication of at least one assigned group from an access point (AP), wherein the receiver is further configured to receive a data frame, wherein the data frame includes a data packet and a group identifier to enable the STA to determine that the data packet is intended for the assigned at least one assigned group; and
   a processor configured to determine whether the group identifier received in the data frame corresponds to the at least one assigned group, and wherein the processor is further configured to enter a power saving mode on a condition that the group identifier received in the data frame does not correspond to the at least one assigned group.

2. The STA of claim 1, wherein the receiver is further configured to receive a data frame that includes an indication of a destination of the data frame, and wherein the processor is further configured to enter a power saving mode on a condition that the indication of the destination of the data frame is not the STA.

3. The STA of claim 1, wherein the receiver is further configured to receive a data frame that includes an indication of a destination of the data frame, and wherein the processor is further configured to enter a power saving mode on a condition that the indication of the destination of the data frame is the AP.

4. The STA of claim 1, wherein the at least one assigned group is based on a traffic utilization of each one of a plurality of STAs.

5. The STA of claim 1, wherein the at least one assigned group is based on a power level.

6. A method for use in a wireless station (STA), the method comprising:
   receiving an indication of at least one assigned group from an access point (AP);
   receiving a data frame, wherein the data frame includes a data packet and a group identifier to enable the STA to determine that the data packet is intended for the assigned at least one assigned group;
   determining whether the group identifier received in the data frame corresponds to the at least one assigned group; and
   entering a power saving mode on a condition that the group identifier received in the data frame does not correspond to the at least one assigned group.

7. The method of claim 6 further comprising:
   receiving a data frame that includes an indication of a destination of the data frame; and
   entering a power saving mode on a condition that the indication of the destination of the data frame is not the STA.

8. The method of claim 6 further comprising:
   receiving a data frame that includes an indication of a destination of the data frame; and
   entering a power saving mode on a condition that the indication of the destination of the data frame is the AP.

9. The method of claim 6, wherein the at least one assigned group is based on a traffic utilization of each one of a plurality of STAs.

10. The method of claim 6, wherein the at least one assigned group is based on a power level.

11. An access point (AP) comprising:
    a processor configured to assign a station (STA) to at least one of a plurality of groups;
    a transmitter configured to transmit, to the STA, an indication of the assigned at least one of the plurality of groups;
    wherein the processor is configured to generate a data frame including a data packet destined to the STA, and a group identifier associated with one of the assigned at least one of the plurality of groups; and
    wherein the transmitter is further configured to transmit the data frame including the data packet and the group identifier, to the STA, to enable the STA to determine that the data packet is intended for the assigned at least one of the plurality of groups.

12. The AP of claim 11, wherein the processor is configured to assign the at least one of the plurality of groups based on a traffic utilization of each one of a plurality of STAs.

13. The AP of claim 11, wherein the processor is configured to assign the at least one of the plurality of groups based on a power level.

14. The AP of claim 11, wherein the processor is configured to assign the STA to more than one group.

15. The AP of claim 11, wherein the processor is configured to assign the STA to at least one of the plurality of groups based on a quality of service requirement.

16. A method for use in an access point (AP), the method comprising:
    assigning a station (STA) to at least one of a plurality of groups;
    transmitting, to the STA, an indication of the assigned at least one of the plurality of groups;
    generating a data frame including a data packet destined to the STA, and a group identifier associated with one of the assigned at least one of the plurality of groups; and
    transmitting the data frame to the STA, wherein the data frame includes the data packet and the group identifier, to enable the STA to determine that the data packet is intended for the assigned at least one of the plurality of groups.

17. The method of claim 16, wherein the at least one of the plurality of groups is assigned based on a traffic utilization of each one of a plurality of STAs.

18. The method of claim 16, wherein the at least one of the plurality of groups is assigned based on a power level.

19. The method of claim 16, wherein the STA is assigned to more than one group.

20. The method of claim 16, wherein the STA is assigned to at least one of the plurality of groups based on a quality of service requirement.

21. An access point (AP) comprising:
    a processor configured to assign a station (STA) to a group;
    a transmitter configured to transmit, to the STA, an indication of the assigned groups;
    wherein the processor is configured to generate a data frame including a data packet destined to the STA and a group identifier associated with the assigned group; and
    wherein the transmitter is further configured to transmit the data frame to the STA.

* * * * *